(12) United States Patent
Behzadpour (10) Patent No.: US 10,974,478 B2
(45) Date of Patent: Apr. 13, 2021

(54) INTERLEAVED LAYER CONSTRUCTION AND A PLANK FOR STIFFENING A PANEL

(71) Applicant: The Boeing Company, Chicago, IL (US)

(72) Inventor: Forouzan Behzadpour, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 16/296,687

(22) Filed: Mar. 8, 2019

(65) Prior Publication Data

US 2020/0282692 A1 Sep. 10, 2020

(51) Int. Cl.
*B32B 7/12* (2006.01)
*B32B 3/26* (2006.01)
*B32B 37/12* (2006.01)

(52) U.S. Cl.
CPC ............... *B32B 3/263* (2013.01); *B32B 7/12* (2013.01); *B32B 37/12* (2013.01); *B32B 2605/18* (2013.01)

(58) Field of Classification Search
CPC .......... B64C 3/182; B64C 1/064; B64C 1/12; B64C 3/20; B64C 3/26; B64C 2001/0072; B29C 70/30; B29D 99/0014; B32B 5/26; B32B 2605/18; B32B 3/263; B32B 7/12; B32B 37/12; B29L 2031/3082; B29L 2031/3085
See application file for complete search history.

(56) References Cited

U.S. PATENT DOCUMENTS

| | | | | | |
|---|---|---|---|---|---|
| 4,606,961 | A | * | 8/1986 | Munsen | B29C 70/08 428/105 |
| 5,069,737 | A | * | 12/1991 | Guiton | B29D 99/0014 156/210 |
| 5,639,535 | A | * | 6/1997 | McCarville | B29C 70/30 428/119 |
| 2002/0178992 | A1 | * | 12/2002 | Lewit | B32B 5/022 114/357 |
| 2005/0230552 | A1 | * | 10/2005 | Engwall | B29C 33/485 244/133 |
| 2008/0111024 | A1 | * | 5/2008 | Lee | B64C 1/068 244/121 |
| 2011/0268926 | A1 | * | 11/2011 | Cruz Dominguez | B64C 1/12 428/172 |
| 2015/0165742 | A1 | * | 6/2015 | Reese, Jr. | B32B 7/12 156/64 |
| 2015/0298388 | A1 | * | 10/2015 | Wong | B32B 27/08 428/413 |
| 2015/0367619 | A1 | * | 12/2015 | Butler | B29D 99/0003 428/57 |

(Continued)

FOREIGN PATENT DOCUMENTS

EP WO2009146958 A1 12/2009
FR 3044291 A1 6/2017

OTHER PUBLICATIONS

European Search Report dated Jul. 20, 2020 in co-pending European Patent Application No. 20153352.8.

*Primary Examiner* — Travis M Figg
(74) *Attorney, Agent, or Firm* — Joseph M. Rolnicki; Evans & Dixon, L.L.C.

(57) ABSTRACT

An interleaved layer construction of a composite panel and a composite plank constructed of three sub-planks that are adhered together and secured to the panel stiffen and strengthen the panel.

20 Claims, 3 Drawing Sheets

(56) References Cited

U.S. PATENT DOCUMENTS

| | | | |
|---|---|---|---|
| 2016/0121591 A1* | 5/2016 | MacAdams | B29C 65/4835 |
| | | | 156/307.3 |
| 2016/0176500 A1* | 6/2016 | Ross | B64C 3/18 |
| | | | 428/157 |
| 2016/0207607 A1* | 7/2016 | Charles | B64C 1/12 |
| 2017/0057615 A1* | 3/2017 | Charles | B32B 5/024 |
| 2019/0016436 A1* | 1/2019 | Stickler | B64C 3/20 |
| 2019/0193371 A1* | 6/2019 | Shinozaki | B32B 5/10 |

* cited by examiner

INTERLEAVED LAYER CONSTRUCTION AND A PLANK FOR STIFFENING A PANEL

FIELD

This disclosure pertains to the stiffening and strengthening of a panel. In particular, this disclosure pertains to an interleaved layer construction of a composite panel and a composite plank secured to the panel that stiffen and strengthen the panel.

BACKGROUND

In the manufacturing of composite panels, and in particular composite panels manufactured as aircraft components such as an aircraft wing panel, some type of stiffener is often employed to stiffen the panel. The panel and the stiffener are often manufactured of composite materials, and are often manufactured of the same composite materials.

The composite panel is often constructed of layers of composite material. The layers of composite material are stacked or laid up on each other, and the layers are then co-cured or co-bonded to form the panel. The panel often has a general planar configuration, and could be substantially flat, or have some curvature.

The stiffener is also often constructed of layers of composite materials. Stiffeners have various different configurations. One such stiffener configuration is that of a plank. A "plank" is often defined as a piece of lumber cut thicker than a board, or a heavy thick board. Thus, a "plank" stiffener of composite material has a configuration similar to that of a thick piece of lumber or a heavy thick board.

Since the early days of research and development of composite materials used in the construction of stiffeners for composite panels, stiffeners configured as planks have been studied numerous times. However, these studies of stiffeners configured as planks have failed to produce a workable concept. This was mainly due to planks constructed of layers of composite material stacked or laid up on each other and then co-cured or co-bonded fail to address inherent weaknesses of the layers of composites in the short, transverse or width dimension of the plank configuration with respect to the length dimension of the plank configuration and the thickness dimension of the plank configuration. Also, planks constructed of layers of composite material would exhibit high free edge intralaminar/interlaminar stresses, and high exothermal stresses, all associated with the size of the plank and in particular the thickness dimension of the plank. Mechanical stresses and thermal stresses in a plank constructed of layers of composite material are directly related to the size of the plank and in particular the thickness dimension of the plank. The mechanical stresses and thermal stresses in the plank are also related to the ply percentages of the fibers in the layers of composite material that make up the plank, (or the percentage of 0° fiber layers, + fiber layers, 90° fiber layers and −fiber layers). Also, the stacking sequence of the fiber layers all contribute to the mechanical stress and thermal stress in the construction of the plank.

SUMMARY

The interleaved construction of the panel of this disclosure and the construction of the plank that is secured to and stiffens the panel overcome the detrimental effects associated with stiffening a composite panel with a conventional plank constructed of layers of composite material.

The plank has an elongate configuration with a longitudinal length dimension, a lateral width dimension and a thickness dimension. The plank is constructed of two or more sub-planks, and in this disclosure three sub-planks. The plank is comprised of a bottom sub-plank in the plank, an intermediate sub-plank in the plank and a top sub-plank in the plank.

The bottom sub-plank in the plank is configured for engagement with the composite panel to stiffen the composite panel with the plank. The bottom sub-plank is constructed of layers of composite material that have been co-bonded together.

The intermediate sub-plank in the plank is configured for engagement with the bottom sub-plank. The intermediate sub-plank is also constructed of layers of composite material that have been co-bonded together.

The top sub-plank in the plank is configured for engagement with the intermediate sub-plank. The top sub-plank is also constructed of layers of composite material that have been co-bonded together.

A first layer of adhesive is applied between and engages with the bottom sub-plank and the intermediate sub-plank. The first layer of adhesive secures the intermediate sub-plank to the bottom sub-plank. Additionally, the first layer of adhesive securing the intermediate sub-plank to the bottom sub-plank is a first barrier layer that obstructs stresses from being transmitted between the bottom sub-plank and the intermediate sub-plank.

A second layer of adhesive is applied between and engages with the top sub-plank and the intermediate sub-plank. The second layer of adhesive secures the top sub-plank to the intermediate sub-plank. Additionally, the second layer of adhesive securing the top sub-plank to the intermediate sub-plank is a second barrier layer that obstructs stresses from being transmitted between the top sub-plank and the intermediate sub-plank.

The layers of composite material of the bottom sub-plank have been co-bonded and the layers of composite material of the intermediate sub-plank have been co-bonded prior to the intermediate sub-plank and the bottom sub-plank engaging against the first layer of adhesive with the first layer of adhesive securing the intermediate sub-plank to the bottom sub-plank.

The layers of composite material of the intermediate sub-plank have been co-bonded and the layers of composite material of the top sub-plank have been co-bonded prior to the intermediate sub-plank and the top sub-plank engaging against the second layer of adhesive with the second layer of adhesive securing the intermediate sub-plank to the top sub-plank.

The composite panel has an elongate configuration with a longitudinal length dimension, a lateral width dimension and a thickness dimension. The composite panel is constructed of layers of composite material that have been co-bonded together and that extend along the longitudinal length dimension of the composite panel and along the lateral width dimension of the composite panel.

There are layers of tapes of composite material in the thickness dimension of the composite panel. The tapes of composite material are interleaved in the layers of composite material of the composite panel and have been co-bonded with the layers of composite material of the composite panel. The tapes of composite material extend along the length dimension of the composite panel. The layers of tapes interleaved in the layers of composite material of the composite panel form a raised ridge in the top surface of the composite panel. The raised ridge extends along the length dimension of the composite panel. The raised ridge also forms a stiffener of the composite panel.

The plank is secured by a third layer of adhesive to the raised ridge on the top surface of the composite panel with the plank extending along the lengths of the tapes of composite material interleaved in the layers of composite material of the composite panel. The tapes of the composite material are positioned in the thickness dimension of the composite panel only beneath the plank secured to the raised ridge of the composite panel.

The composite panel is stiffened by the layers of tapes of composite material interleaved in the layers of composite material of the composite panel forming the raised ridge on the composite panel, and the plank comprised of the bottom sub-plank, the intermediate sub-plank and the top sub-plank secured to the raised ridge.

The features, functions, and advantages that have been discussed can be achieved independently in various embodiments or may be combined in yet other embodiments, further details of which can be seen with reference to the following description and drawings.

DETAILED DESCRIPTION

Figure 1:
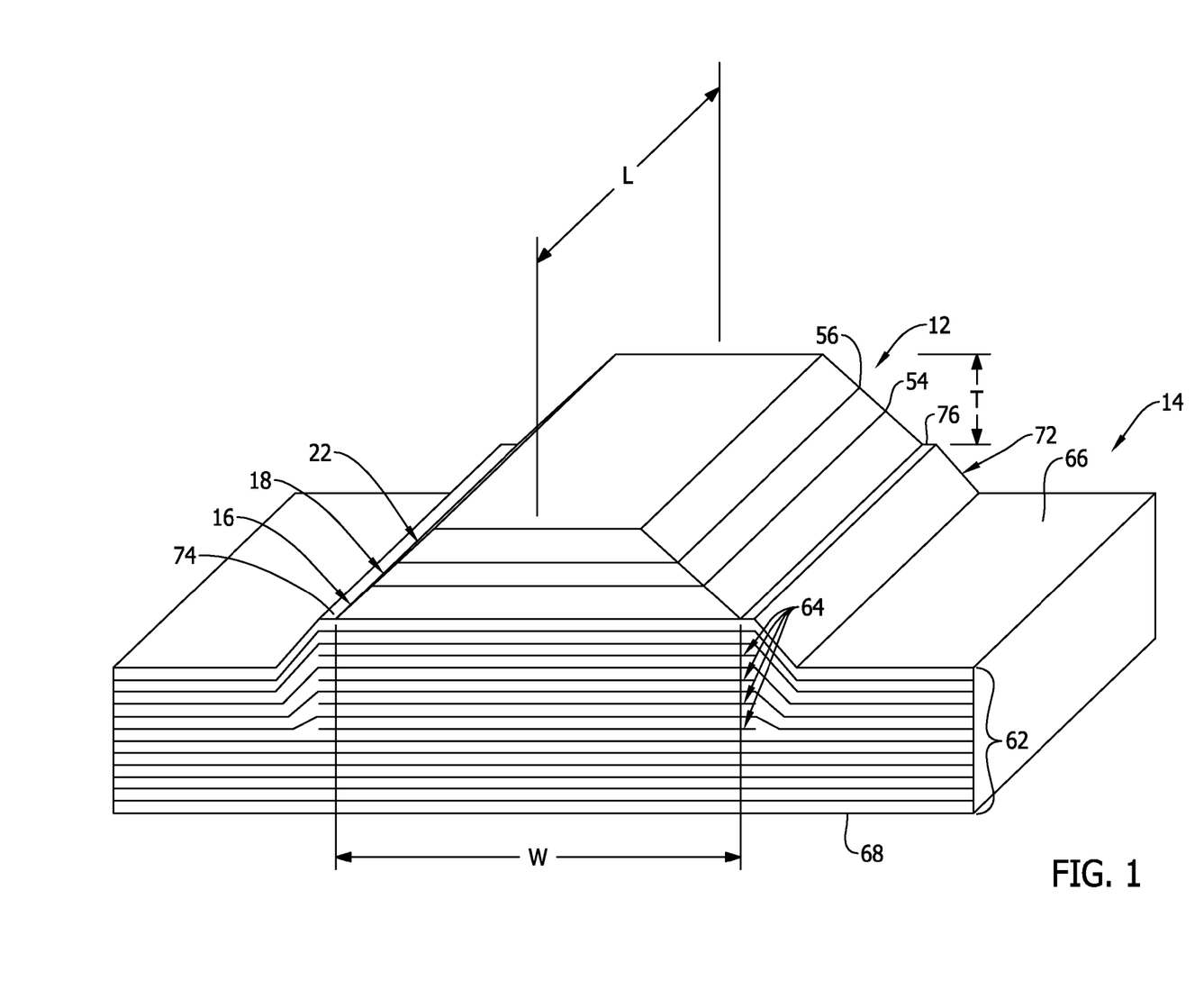
FIG. 1 is a representation of a perspective view of the plank of this disclosure secured to and stiffening the panel of this disclosure.

FIG. 1 is a representation of a perspective view of the plank 12 of this disclosure secured to the top surface of the panel 14 of this disclosure. The horizontal orientations of the plank 12 and panel 14 represented in FIG. 1 are only for the purposes of this disclosure. The plank 12 and panel 14 could be oriented vertically. The orientations of the plank 12 and panel 14 could be rotated 180°, where the plank 12 would then be secured to a bottom surface of the panel 14. Additionally, the plank 12 and panel 14 are represented in FIG. 1 as having general rectangular configurations. The plank 12 and panel 14 could have other equivalent configurations, depending on the operative environment of the plank 12 and panel 14.

The plank 12 has an elongate configuration with a longitudinal length dimension L, a lateral width dimension W and a thickness dimension T. The plank 12 is constructed of two or more sub-planks, and in this disclosure three sub-planks. The plank 12 is comprised of a bottom sub-plank 16 in the plank, an intermediate sub-plank 18 in the plank and a top sub-plank 22 in the plank.

Figure 2:
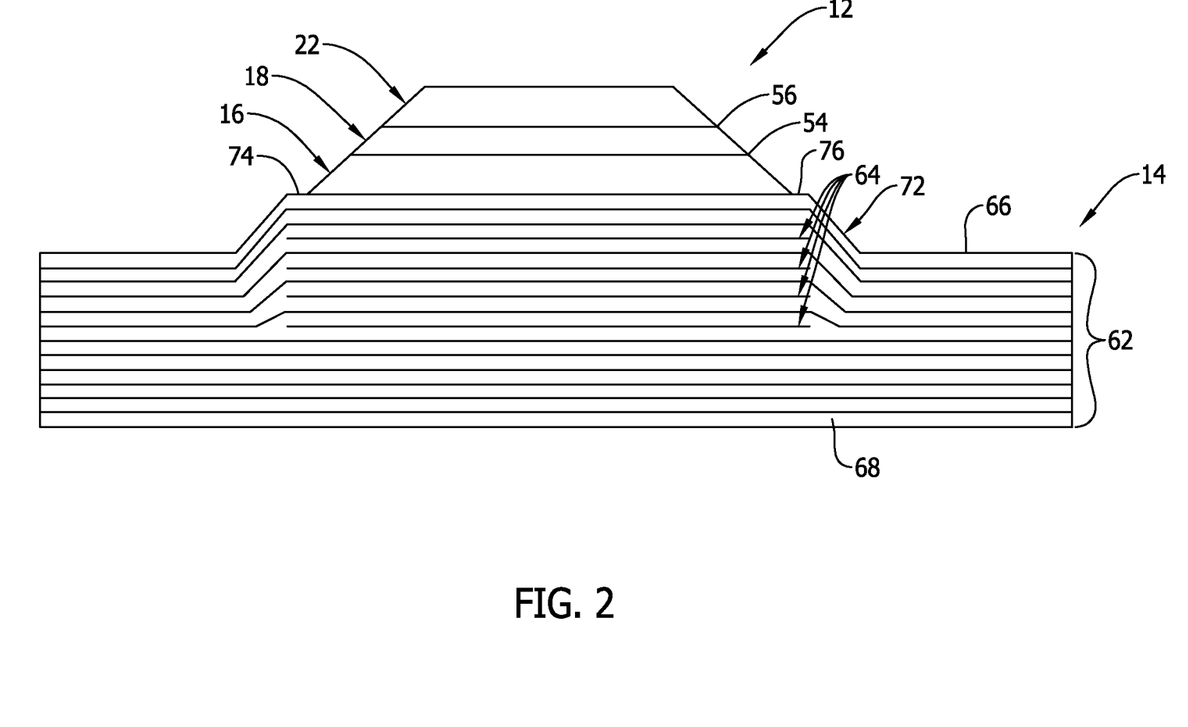
FIG. 2 is a representation of a cross-section view of the plank and panel of FIG. 1.
Figure 3:
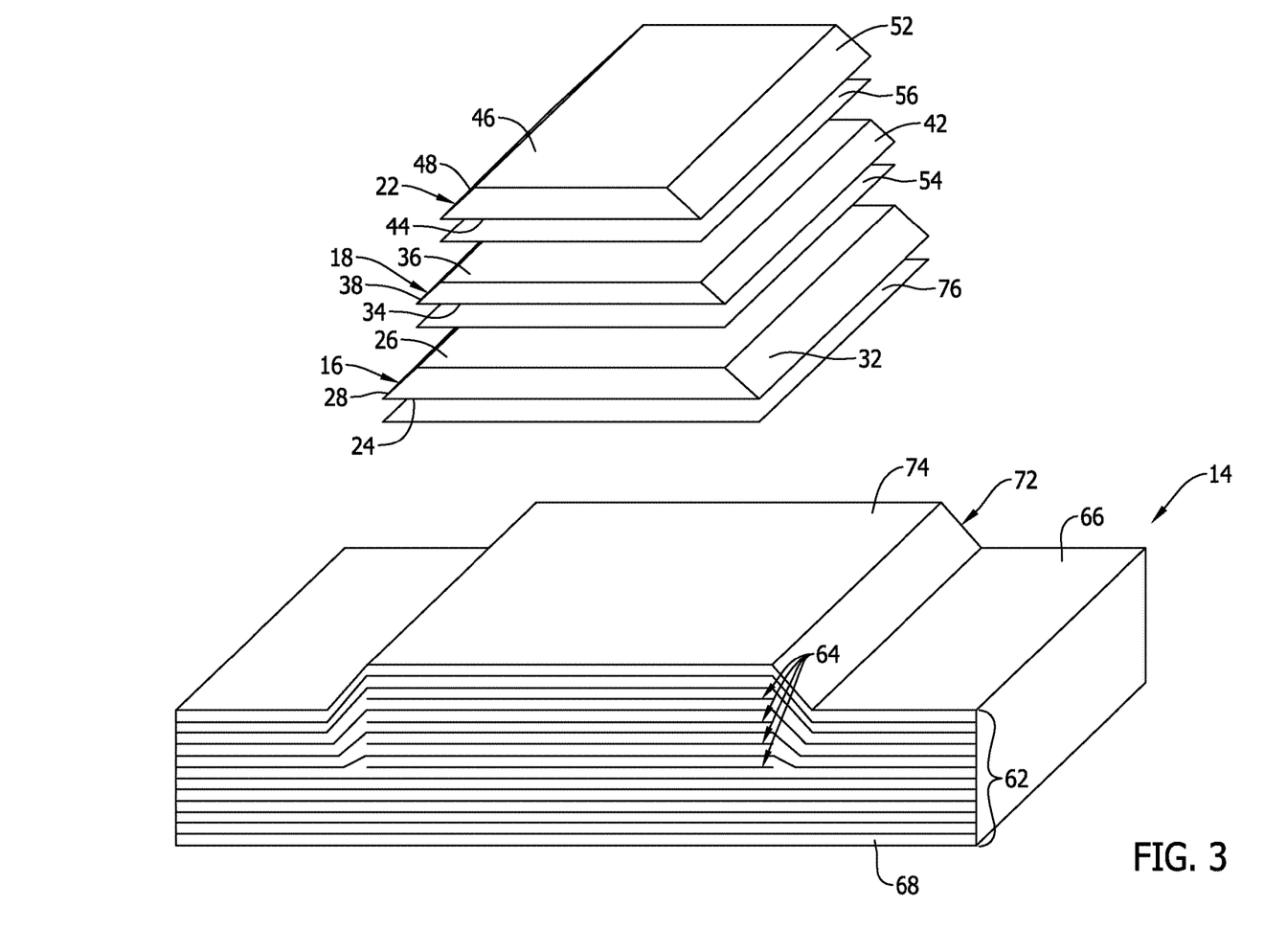
FIG. 3 is a representation of an exploded view of the components that go into the construction of the plank and panel of FIG. 1.

The bottom sub-plank 16 is constructed of layers of composite material. In this disclosure the layers of composite material are pre-preg composite material. However, other equivalent types of composite materials could be used in constructing the bottom sub-plank 16. Each of the layers of pre-preg composite material are comprised of unidirectional fibers, for example carbon fibers in a matrix material such as an epoxy matrix. In each layer of composite material, the fibers embedded in the matrix material are all oriented in a single direction. Some layers of composite material in the bottom sub-plank 16 have fibers that are oriented at 0° relative to the longitudinal length dimension of the plank 12, forming a 0° layer of fibers. Some layers of composite material in the bottom sub-plank 16 have fibers that are oriented at an acute angle relative to the length dimension L of the plank 12, for example at +45°, forming a + layer of fibers. Some of the layers of composite material in the bottom sub-plank 16 have fibers that are oriented at an acute angle, for example −45° relative to the length dimension L of the plank 12, forming a − layer. Some of the layers of composite material in the bottom sub-plank 16 have fibers that are oriented at a 90° angle relative to the length dimension L of the plank 12, forming a 90° layer. In the layers of composite material that make up the bottom sub-plank 16, the 0° layers or layers with unidirectional fibers oriented along the length dimension L of the plank 12 predominate. The layers of composite material that make up the bottom sub-plank 16 are laid up and then co-bonded, producing the bottom sub-plank 16. Each of the layers of composite material has a lateral width dimension that reduces or gets slightly smaller as each layer of composite material is sequentially laid up in forming the bottom sub-plank 16. This gives the bottom sub-plank 16 a general trapezoidal cross-section configuration. The trapezoidal cross-section configuration of the bottom sub-plank 16 alleviates high free-edge interlaminar stresses which could lead to delamination of the layers of composite material in the bottom sub-plank 16. The trapezoidal cross-section configuration of the bottom sub-plank 16 also prevents bow waves in the layers of composite material after they have been cured and co-bonded along the length dimension of the bottom sub-plank 16. The bottom sub-plank 16, constructed in the manner described above has a bottom surface 24 that is configured for engagement with the panel 14 to stiffen the panel with the plank 12. The bottom sub-plank 16 also has a top surface 26 that is opposite the bottom surface 24 of the bottom sub-plank 16. The bottom sub-plank 16 also has a left side surface 28 and an opposite right side surface 32, Together, the bottom surface 24, the top surface 26, the left side surface 28 and the right side surface 32 define the trapezoidal cross-section configuration of the bottom sub-plank 16.

The intermediate sub-plank 18 is constructed of layers of composite material. In this disclosure the layers of composite material are pre-preg composite material. However, other equivalent types of composite materials could be used in constructing the intermediate sub-plank 18. Each of the layers of pre-preg composite material are comprised of unidirectional fibers, for example carbon fibers in a matrix material such as an epoxy matrix. In each layer of composite material, the fibers embedded in the matrix material are all oriented in a single direction. Some layers of composite material in the intermediate sub-plank 18 have fibers that are oriented at 0° relative to the longitudinal length dimension of the plank 12, forming a 0° layer of fibers. Some layers of composite material in the intermediate sub-plank 18 have fibers that are oriented at an acute angle relative to the length dimension L of the plank 12, for example at +45°, forming a + layer of fibers. Some of the layers of composite material in the intermediate sub-plank 18 have fibers that are oriented at an acute angle, for example −45° relative to the length dimension L of the plank 12, forming a − layer. Some of the layers of composite material in the intermediate sub-plank 18 have fibers that are oriented at a 90° angle relative to the length dimension L of the plank 12, forming a 90° layer. In the layers of composite material that make up the intermediate sub-plank 18, the 0° layers or layers with unidirectional fibers oriented along the length dimension L of the plank 12 predominate. The layers of composite material that make up the intermediate sub-plank 18 are laid up and then co-bonded, producing the intermediate sub-plank 18. Each of the layers of composite material has a lateral width dimension that reduces or gets slightly smaller as each layer of composite material is sequentially laid up in forming the intermediate sub-plank 18. This gives the intermediate sub-plank 18 a general trapezoidal cross-section configuration. The trapezoidal cross-section configuration of the intermediate sub-plank 18 alleviates high free-edge interlaminar stresses which could lead to delamination of the layers of composite material in the intermediate sub-plank 18. The trapezoidal cross-section configuration of the intermediate sub-plank 18 also prevents bow waves in the layers of composite material after they have been cured and co-bonded along the length dimension of the intermediate sub-plank 18. The intermediate sub-plank 18, constructed in the manner described above has a bottom surface 34 that is configured for engagement with the top surface 26 of the bottom sub-plank 16. The intermediate sub-plank 18 also has a top surface 36 that is opposite the bottom surface 34 of the intermediate sub-plank 18. The intermediate sub-plank 18 also has a left side surface 38 and an opposite right side surface 42. Together, the bottom surface 34, the top surface 36, the left side surface 38 and the right side surface 42 define the trapezoidal cross-section configuration of the intermediate sub-plank 18.

The top sub-plank 22 is constructed of layers of composite material. In this disclosure the layers of composite material are pre-preg composite material. However, other equivalent types of composite materials could be used in constructing the top sub-plank 22. Each of the layers of pre-preg composite material are comprised of unidirectional fibers, for example carbon fibers in a matrix material such as an epoxy matrix. In each layer of composite material, the fibers embedded in the matrix material are all oriented in a single direction. Some layers of composite material in the top sub-plank 22 have fibers that are oriented at 0° relative to the longitudinal length dimension of the plank 12, forming a 0° layer of fibers. Some layers of the layers of composite material in the top sub-plank 22 have fibers that are oriented at an acute angle relative to the length dimension L of the plank 12, for example at +45°, forming a + layer of fibers. Some of the layers of the layers of composite material in the top sub-plank 22 have fibers that are oriented at an acute angle, for example −45° relative to the length dimension L of the plank 12, forming a − layer. Some of the layers of composite material in the top sub-plank 22 have fibers that are oriented at a 90° angle relative to the length dimension L of the plank 12, forming a 90° layer. In the layers of composite material that make up the top sub-plank 22, the 0° layers or layers with unidirectional fibers oriented along the length dimension L of the plank 12 predominate. The layers of composite material that make up the top sub-plank 22 are laid up and then co-bonded, producing the top sub-plank 22. Each of the layers of composite material has a lateral width dimension that reduces or gets slightly smaller as each layer of composite material is sequentially laid up in forming the top sub-plank 22. This gives the top sub-plank 22 a general trapezoidal cross-section configuration. The trapezoidal cross-section configuration of the top sub-plank 22 alleviates high free-edge interlaminar stresses which could lead to delamination of the layers of composite material in the top sub-plank 22. The trapezoidal cross-section configuration of the top sub-plank 22 also prevents bow waves in the layers of composite material after they have been cured and co-bonded along the length dimension of the top sub-plank 22. The top sub-plank 22, constructed in the manner described above has a bottom surface 44 that is configured for engagement with the top surface 36 of the intermediate sub-plank 18. The top sub-plank 22 also has a top surface 46 that is opposite the bottom surface 44 of the top sub-plank 22. The top sub-plank 22 also has a left side surface 48 and an opposite right side surface 52. Together, the bottom surface 44, the top surface 46, the left side surface 48 and the right side surface 52 define the trapezoidal cross-section configuration of the top sub-plank 22.

A first layer of adhesive 54 is applied between and engages with the top surface 26 of the bottom sub-plank 16 and the bottom surface 34 of the intermediate sub-plank 18. The first layer of adhesive 54 secures the intermediate sub-plank 18 to the top surface 26 of the bottom sub-plank 16. The first layer of adhesive 54 has a configuration that matches the configuration of the top surface 26 of the bottom sub-plank 16 and the bottom surface 34 of the intermediate sub-plank 18. Additionally, the first layer of adhesive 54 securing the intermediate sub-plank 18 to the top surface 26 of the bottom sub-plank 16 forms a first barrier layer 54 between the intermediate sub-plank 18 and the bottom sub-plank 16. The first barrier layer 54 obstructs stresses, for example fractures from being transmitted from the bottom sub-plank 16 through the first barrier layer 54 to the intermediate sub-plank 18, and also obstructs stresses such as fractures from being transmitted from the intermediate sub-plank 18 through the first barrier layer 54 to the bottom sub-plank 16.

A second layer of adhesive 56 is applied between and engages with the bottom surface 44 of the top sub-plank 22 and the top surface 36 of the intermediate sub-plank 18. The second layer of adhesive 56 has a configuration that matches the configuration of the bottom surface 44 of the top sub-plank 22 and the top surface 36 of the intermediate sub-plank 18. Additionally, the second layer of adhesive 56 securing the top sub plank 22 to the top surface 36 of the intermediate sub-plank 18 forms a second barrier layer 56 between the top sub-plank 22 and the intermediate sub-plank 18. The second barrier layer 56 obstructs stresses, for example fractures from being transmitted from the top sub-plank 22 through the second barrier layer 56 to the intermediate sub-plank 18, and also obstructs stresses such as fractures from being transmitted from the intermediate sub-plank 18 through the second barrier layer 56 to the top sub-plank 22.

The layers of composite material of the bottom sub-plank 16 have been co-bonded and the layers of composite material of the intermediate sub-plank 18 have been co-bonded prior to the bottom sub-plank 16 and the intermediate sub-plank 18 being adhered together by the first layer of adhesive 54 or the first barrier layer 54. Additionally, the layers of composite material of the intermediate sub-plank 18 have been co-bonded and the layers of composite material of the top sub-plank 22 have been co-bonded prior to the intermediate sub-plank 18 being adhered to the top sub-plank 22 by the second layer of adhesive 56 or second barrier layer 56.

Forming the plank 12 comprised of the bottom sub-plank 16, the intermediate sub-plank 18 and the top sub-plank 22 that are each separately formed as sub-planks and that are adhered together to form the plank 12 enables the plank 12 to be constructed with a thickness dimension of the combined layers of composite material of the three sub-planks, while alleviating high mechanical and thermal residual stresses by dividing the plank 12 into three co-bonded sub-planks and using the layers of adhesive 54, 56 as barriers separating the three sub-planks. This would not have been possible by forming the plank 12 comprised of the layers of composite material in the bottom sub-plank 16, the layers of composite material in the intermediate sub-plank 18 and the layers of composite material in the top sub-plank 22 being laid up on or stacked on each other and then co-bonding the stacked layers. Such a plank would have the high mechanical and thermal residual stresses that are avoided by the plank 12 of the disclosure that employs the first layer of adhesive 54 and the second layer of adhesive 56 to divide the stacked layers of composite material into three separate sub-planks.

The panel 14 has an elongate configuration with a longitudinal length dimension that is substantially the same as the longitudinal length dimension L of the plank 12, a lateral width dimension and a thickness dimension. The panel 14 is constructed in substantially the same manner as each of the individual sub-planks 16, 18, 22. The panel 14 is constructed of layers of composite material 62 that have been laid up and co-bonded, forming the panel 14 as a composite panel 14. The layers of composite material 62 that make up the composite panel 14 in this disclosure are pre-preg composite materials. However, other equivalent types of composite materials may be employed in constructing the composite panel 14. In laying up the layers of pre-preg composite material in constructing the composite panel 14, some of the layers are 0° layers, some of the layers are + layers, some of the layers are 90° layers and some of the layers are − layers.

There are layers of composite tapes 64 in the thickness dimension of the composite panel 14. Each layer of composite tape 64 has a length dimension that is substantially the same length dimension L as the plank 12 and the panel 14, and a lateral width dimension that is slightly larger than the lateral width dimension W of the plank 12. The tapes of composite material 64 are interleaved in the layers of composite material 62 of the composite panel 14 and have been co-bonded with the layers of composite material 62 of the composite panel 14. The tapes 64 are unidirectional tapes with the fibers of each tape forming the tapes as 0° tapes. The 0° fibers of the layers of composite tapes 64 extend along the longitudinal length dimension L of the plank 12 and the longitudinal length dimension of the panel 14. The layers of composite tapes 64 interleaved in the layers of composite material 62 of the composite panel 14 are positioned in the thickness dimension of the composite panel 14 closer to a top surface 66 of the composite panel 14 than to a bottom surface 68 of the composite panel 14. The positioning of the layers of tapes 64 in the thickness dimension of the composite panel 14 closer to the top surface 66 of the composite panel 14 forms a raised ridge 72 in the top surface 66 of the composite panel 14. The raised ridge 74 extends along the longitudinal length dimension of the composite panel 14. The raised ridge 72 also forms a stiffener in the composite panel 14. The raised ridge 72 has a lateral width dimension at a top surface 74 of the ridge 72 that is slightly larger than the lateral width dimension of the bottom surface 24 of the bottom sub-plank 16 in the plank 12.

The plank 12 is secured by a third layer of adhesive 76 to the raised ridge 72. The third layer of adhesive 76 has a configuration substantially the same as the configuration of the bottom surface 24 of the bottom sub-plank 16. The third layer of adhesive 76 secures the bottom surface 24 of the bottom sub-plank 16 to the top surface 74 of the raised ridge 72, and thereby secures the plank 12 to the panel 14. The longitudinal length dimension L of the plank 12 extends along the longitudinal length of the raised ridge 72 and along the longitudinal length of the layers of composite tapes 64 in the panel 14. The layers of composite tapes 64 interleaved in the layers of composite material 62 of the composite panel 14 are positioned in the composite panel 14 only beneath the plank 12 secured to the raised ridge 72 of the composite panel 14.

The composite panel 14 is stiffened by the layers of tapes of composite material 64 interleaved in the layers of composite material 62 of the composite panel 14 forming the raised ridge 72 on the composite panel 14, and by the plank 12 comprised of the bottom sub-plank 16, the intermediate sub-plank 18 and the top sub-plank 22 secured to the raised ridge 72.

Constructing the plank 12 of the bottom sub-plank 16, the intermediate sub-plank 18 and the top sub-plank 22 that are adhered together by the first layer of adhesive 54 and the second layer of adhesive 56 enables the plank 12 to be constructed with a thickness dimension of the combined layers of composite material of the three sub-planks 16, 18, 22, while alleviating high mechanical and thermal residual stresses by dividing the plank 12 into three co-bonded sub-planks 16, 18, 22 and using the layers of adhesives 54, 56 as barriers separating the three sub-planks 16, 18, 22.

As various modifications could be made in the construction of the plank 12 and composite panel 14, and the method of constructing the plank 12 and composite panel 14 herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A stiffener for a composite panel, the stiffener comprising:
    a plank, the plank having an elongate configuration with a longitudinal length dimension, a lateral width dimension and a thickness dimension;
    a bottom sub-plank in the plank, the bottom sub-plank being constructed of layers of composite material;
    a first layer of adhesive on the bottom sub-plank;
    an intermediate sub-plank in the plank, the intermediate sub-plank being constructed of layers of composite material, the intermediate sub-plank engaging against the first layer of adhesive with the first layer of adhesive securing the intermediate sub-plank to the bottom sub-planks;
    a composite panel, the composite panel having a configuration with a longitudinal length dimension, a lateral width dimension and a thickness dimension, the composite panel being constructed of layers of composite material;
    the plank being secured to the composite panel; and,
    layers of tapes of composite material in the composite panel, the tapes of composite material being interleaved in the layers of composite material of the composite panel, the tapes of composite material extending along the longitudinal length dimension of the composite panel and along the longitudinal length dimension of the plank, the tapes of composite material being positioned in the thickness dimension of the composite panel only beneath the plank on the composite panel.

2. The stiffener of claim 1, further comprising:
    the composite panel having a bottom surface and a top surface on an opposite side of the composite panel from the bottom surface;

the layers of tapes interleaved in the layers of composite material of the composite panel being positioned in the thickness dimension of the composite panel and forming a raised ridge in the top surface of the composite panel, the raised ridge extending along the longitudinal length dimension of the composite panel; and, the plank being secured to the composite panel on the raised ridge.

3. The stiffener of claim 1, further comprising:
the first layer of adhesive securing the intermediate sub-plank to the bottom sub-plank being a first barrier layer that obstructs stresses from being transmitted from the bottom sub-plank to the intermediate sub-plank and that obstructs stresses from being transmitted from the intermediate sub-plank to the bottom sub-plank.

4. The stiffener of claim 1, further comprising:
the layers of composite material of the bottom sub-plank have been co-bonded and the layers of the composite material of the intermediate sub-plank have been co-bonded prior to the intermediate sub-plank engaging against the first layer of adhesive with the first layer of adhesive securing the intermediate sub-plank to the bottom sub-plank.

5. The stiffener of claim 1, further comprising:
the bottom sub-plank has a trapezoidal cross-section configuration; and,
the intermediate sub-plank has a trapezoidal cross-section configuration.

6. The stiffener of claim 1, further comprising:
a second layer of adhesive on the intermediate sub-plank; and,
a top sub-plank in the plank, the top sub-plank being constructed of layers of composite material, the top sub-plank engaging against the second layer of adhesive with the second layer of adhesive securing the top sub-plank to the intermediate sub-plank.

7. The stiffener of claim 6, further comprising:
the layers of composite material of the bottom sub-plank have been co-bonded, the layers of composite material of the intermediate sub-plank have been co-bonded and the layers of composite material of the top sub-plank have been co-bonded prior to the intermediate sub-plank engaging against the first layer of adhesive with the first layer of adhesive securing the intermediate sub-plank to the bottom sub-plank and prior to the top sub-plank engaging against the second layer of adhesive with the second layer of adhesive securing the top sub-plank to the intermediate sub-plank.

8. The stiffener of claim 6, further comprising:
the first layer of adhesive securing the intermediate sub-plank to the bottom sub-plank being a first barrier layer that obstructs stresses from being transmitted from the bottom sub-plank to the intermediate sub-plank and that obstructs stresses from being transmitted from the intermediate sub-plank to the bottom sub-plank; and,
the second layer of adhesive securing the top sub-plank to the intermediate sub-plank being a second barrier layer that obstructs stresses from being transmitted from the intermediate sub-plank to the top sub-plank and that obstructs stresses from being transmitted from the top sub-plank to the intermediate sub-plank.

9. The stiffener of claim 6, further comprising:
the bottom sub-plank has a trapezoidal cross-section configuration;
the intermediate sub-plank has a trapezoidal cross-section configuration; and,
the top sub-plank has a trapezoidal cross-section configuration.

10. A stiffener for a composite panel, the stiffener comprising:
a plank, the plank having an elongate configuration with a longitudinal length dimension, a lateral width dimension and a thickness dimension;
a bottom sub-plank in the plank, the bottom sub-plank being constructed of layers of composite material that have been co-bonded together, the bottom sub-plank is configured for engagement with a composite panel to stiffen the composite panel with the plank;
a first layer of adhesive on the bottom sub-plank;
an intermediate sub-plank in the plank, the intermediate sub-plank being constructed of layers of composite material that have been co-bonded together, the intermediate sub-plank engaging against the first layer of adhesive with the first layer of adhesive securing the intermediate sub-plank to the bottom sub-plank;
a composite panel, the composite panel having a configuration with a longitudinal length dimension, a lateral width dimension and a thickness dimension, the composite panel being constructed of layers of composite material that have been co-bonded together and that extend along the longitudinal length dimension of the composite panel and the lateral width dimension of the composite panel;
the plank being secured to the composite panel; and,
layers of tapes of composite material in the composite panel, the layers of tapes of composite material being interleaved in the layers of composite material of the composite panel and having been co-bonded with the layers of composite material of the composite panel, the layers of tapes of composite material extending along the length dimension of the composite panel and along the length dimension of the plank, the layers of tapes of composite material being positioned in the thickness dimension of the composite panel only beneath the plank on the composite panel.

11. The stiffener of claim 10, further comprising:
the composite panel having a bottom surface and a top surface on an opposite side of the composite panel from the bottom surface;
the layers of tapes interleaved in the layers of composite material of the composite panel being positioned in the thickness dimension of the composite panel closer to the top surface of the composite panel than the bottom surface of the composite panel and forming a raised ridge in the top surface of the composite panel, the raised ridge extending along the longitudinal length dimension of the composite panel; and,
the plank being secured to the composite panel on the raised ridge.

12. The stiffener of claim 10, further comprising:
the first layer of adhesive securing the intermediate sub-plank to the bottom sub-plank being a first barrier layer that obstructs stresses from being transmitted from the bottom sub-plank across the first barrier layer to the intermediate sub-plank and that obstructs stresses from being transmitted from the intermediate sub-plank across the first barrier layer to the bottom sub-plank.

13. The stiffener of claim 10, further comprising:
the bottom sub-plank has a trapezoidal cross-section configuration; and,
the intermediate sub-plank has a trapezoidal cross-section configuration.

14. A stiffener for a composite panel, the stiffener comprising:
a plank constructed of a bottom sub-plank and an intermediate sub-plank;
the bottom sub-plank being constructed of layers of composite material that have been co-bonded together;
the intermediate sub-plank being constructed of layers of composite material that have been co-bonded together;
a first adhesive layer applied between the bottom sub-plank and the intermediate sub-plank, the first adhesive layer adhering the bottom sub-plank to the intermediate sub-plank;
a composite panel, the composite panel having an elongate configuration with a longitudinal length dimension, a lateral width dimension and a thickness dimension, the composite panel being constructed of layers of composite material;
the plank being secured to the composite panel; and,
layers of tapes of composite material in the composite panel, the tapes of composite material being interleaved in the layers of composite material of the composite panel, the tapes of composite material extending along the longitudinal length dimension of the composite panel and along a longitudinal length dimension of the plank, the tapes of composite material being positioned in the thickness dimension of the composite panel only beneath the plank on the composite panel.

15. The stiffener of claim 14, further comprising:
the plank being constructed of the bottom sub-plank, the intermediate sub-plank, and a top sub-plank;
the top sub-plank being constructed of layers of composite material that have been co-bonded together; and,
a second layer of adhesive applied between the intermediate sub-plank and the top sub-plank, the second layer of adhesive adhering the intermediate sub-plank and the top sub-plank together.

16. The stiffener of claim 15, further comprising:
the first layer of adhesive securing the intermediate sub-plank to the bottom sub-plank being a first barrier layer that obstructs stresses from being transmitted from the bottom sub-plank across the first barrier layer to the intermediate sub-plank and that obstructs stresses from being transmitted form the intermediate sub-plank across the first barrier layer to the bottom sub-plank; and,
the second layer of adhesive securing the top sub-plank to the intermediate sub-plank being a second barrier layer that obstructs stresses from being transmitted from the top sub-plank across the second barrier layer to the intermediate sub-plank and that obstructs stresses from being transmitted from the intermediate sub-plank across the second barrier layer to the top sub-plank.

17. The stiffener of claim 16, further comprising:
the bottom sub-plank having a trapezoidal cross-section configuration;
the intermediate sub-plank having a trapezoidal cross-section configuration; and,
the top sub-plank having a trapezoidal cross-section configuration.

18. The stiffener of claim 14, further comprising:
the composite panel having a bottom surface and a top surface on an opposite side of the composite panel from the bottom surface;
the layers of tapes interleaved in the layers of composite material of the composite panel being positioned in the thickness dimension of the composite panel and forming a raised ridge in the top surface of the composite panel, the raised ridge extending along the longitudinal length dimension of the composite panel; and,
the plank being secured to the composite panel on the raised ridge.

19. The stiffener of claim 14, further comprising:
the bottom sub-plank being constructed of layers of composite material with each layer of composite material in the bottom sub-plank being comprised of unidirectional fibers; and,
in each layer of composite material of the bottom sub-plank the unidirectional fibers of the layers of composite material being oriented in a single direction.

20. The stiffener of claim 19, further comprising:
the intermediate sub-plank being constructed of layers of composite material with each layer of composite material in the intermediate sub-plank being comprised of unidirectional fibers that are all oriented in a single direction.

* * * * *